United States Patent [19]
Fong et al.

[11] Patent Number: 5,908,874
[45] Date of Patent: *Jun. 1, 1999

[54] POLYMERIZABLE COMPOSITIONS CONTAINING FLUOROCHEMICALS TO REDUCE MELTING TEMPERATURE

[75] Inventors: Bettie C. Fong, Woodbury; Myles L. Brostrom, West Lakeland Township, both of Minn.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/665,613

[22] Filed: Jun. 18, 1996

[51] Int. Cl.⁶ ....................................... C08K 2/46
[52] U.S. Cl. .............................. 522/74; 522/79; 522/182; 522/187; 522/96
[58] Field of Search ................................ 522/74, 79, 187, 522/182, 96

[56] References Cited

U.S. PATENT DOCUMENTS

| | | | |
|---|---|---|---|
| 2,631,998 | 3/1953 | Pearson | 260/87.5 |
| 3,240,757 | 3/1966 | Sterling | 260/63 |
| 3,720,646 | 3/1973 | Sianesi et al. | 260/63 HA |
| 4,576,850 | 3/1986 | Martens | 428/156 |
| 5,009,224 | 4/1991 | Cole | 128/156 |
| 5,036,112 | 7/1991 | Dougherty et al. | 522/31 |
| 5,039,716 | 8/1991 | Vara et al. | 522/96 |
| 5,104,911 | 4/1992 | Marchionni et al. | 522/187 |

*Primary Examiner*—Nam Nguyen
*Assistant Examiner*—Steven H. Ver Steeg
*Attorney, Agent, or Firm*—Stephen W. Buckingham

[57] ABSTRACT

A polymerizable composition has added thereto a fluorochemical in sufficient quantities to reduce the melting temperature of the composition compared with that of the composition absent the fluorochemical.

20 Claims, 1 Drawing Sheet

POLYMERIZABLE COMPOSITIONS CONTAINING FLUOROCHEMICALS TO REDUCE MELTING TEMPERATURE

BACKGROUND OF THE INVENTION

U.S. Pat. No. 5,175,030 (Lu et al.), the teaching of which is incorporated herein by reference, teaches a method of manufacturing structured surface materials by depositing uncured resin having hard and soft segments on a master negative, filling the cavities of the negative by moving a bead of the composition between a substrate and the master, and curing the deposited composition by ultraviolet radiation while keeping the temperature during curing to not more than 50° C. above the typical use temperature of the finished composite plastic article. Hard segments are segments such that a homopolymer of such segments has a glass transition temperature above some preselected value, typically 300 K. Soft segments, alternatively, are segments such that a homopolymer made of such segments has a $T_g$ below 300 K.

Some acrylic resins that are particularly useful in manufacturing microstructured articles for optical uses utilizing the teachings of the Lu et al. patent have a melting temperature, $T_m$, greater than room temperature. Thus they must be heated to practice the method of the Lu et al. patent. Typically the materials according to the Lu et al. patent have been heated to about 55° C. in order to make them sufficiently fluid for them to fill in the cavities of the master.

SUMMARY OF THE INVENTION

According to the present invention a polymerizable composition, preferably an acrylate, has added thereto a fluorochemical in sufficient quantities to reduce the melting temperature of the composition compared with that of the composition absent the fluorochemical.

DETAILED DESCRIPTION

Figure 1:
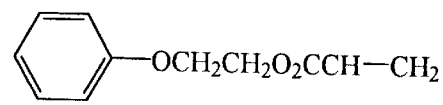
FIG. 1 shows the chemical structure for Photomer 4035.
Figure 2:
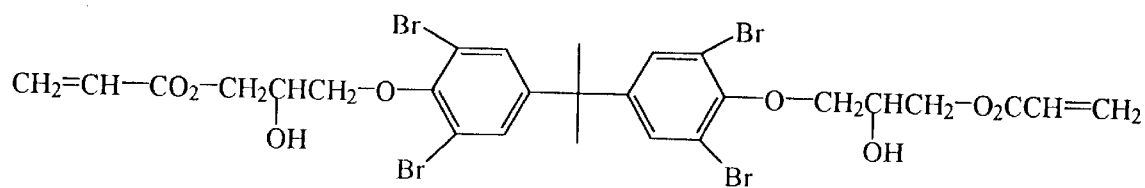
FIG. 2 shows the chemical structure of RDX 51027.
Figure 3:
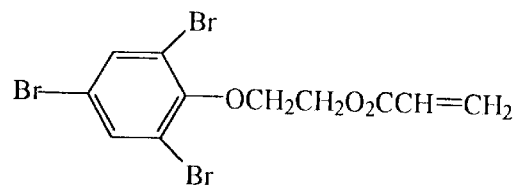
FIG. 3 shows the chemical structure of BR-31.
Figure 4:
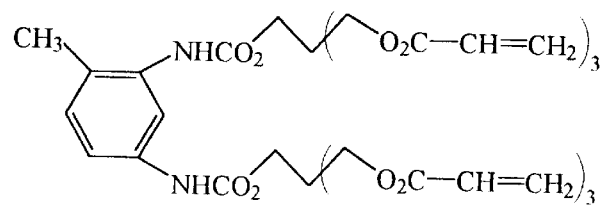
FIG. 4 shows the chemical structure of EB 220.

Common resins used in the process according to the Lu et al. patent for optical products are mixtures of acrylic monomers and oligomers. A typical resin having hard segments and soft segments for polymerizing into an optical product is made by combining 12.5 percent Photomer 4035 commercially available from Henkel Corporation, as shown in FIG. 1, 30 percent RDX 51027 commercially available from UCB Chemical Corporation, as shown in FIG. 2; 37.5 percent BR-31 commercially available from DKS International, as shown in FIG. 3; and 20 percent EB 220 commercially available from UCB Chemical Corporation, as shown in FIG. 4. This a particularly good resin for use with optical components requiring a high index of refraction. Other ratios of the materials could be used as well as other monomers or oligomers, however. This resin has a $T_m$ around 55° C. Thus in order to manufacture a structured surface material by ultraviolet curing of this resin, the resin must be heated to a temperature above the $T_m$ in order to allow it to conform to the shape of the master. Generally it is heated to around 65°. A lower melting temperature is desirable because the melt is easier to handle and to maintain in the melt state during processing and polymerization.

It has been surprisingly found that addition of certain fluorochemicals to the resin in small amounts will reduce the melting temperature significantly. Preferably the temperature is reduced to no more than 40° C. although any reduction of melting temperature is advantageous. This makes it much easier to handle during the molding process and makes it easier to keep the material in a molten step until it has been UV cured. It is believed that the $T_m$ is reduced because of a reduced crystallinity of the uncured resin. Data from x-ray diffraction studies of some of the modified resins tends to confirm this theory.

According to the present invention, a fluorochemical is added to a resin containing hard and soft segments in a quantity sufficient to reduce the $T_m$ of the resin preferably by approximately 15 C. degrees. The amount necessary to make such a reduction in $T_m$ will vary according to the particular fluorochemical chosen. The resin may be polymerized by any known means, but generally exposure to radiation is preferred. Such radiation may be, for example, ultraviolet or electron beam.

Example 1

A mixture of 12.5 percent Photomer 4035, 30 percent RDX 51027, 20 percent EB 220, and 37.5 percent BR-31 was prepared. It was heated to 65° C. for about 1 hour until it melted. Fluorochemical FC-430 was added to the melt in sufficient quantities to bring the FC-430 to 0.3 percent of the mixture. FC-430 is a fluorochemical surfactant that is commercially available from Minnesota Mining and Manufacturing Company under the trade name Flourad™ FC-430 coating additive. It comprises 73.9 percent a 30/70 copolymer of BuFOSA and PL44A. PL44A is acrylated PL44 which is commercially available from BASF. The PL44A has a ratio of 50/25 monoacrylate to diacrylate. The FC-430 further comprises 24.6 percent unreacted PL44 and 1.5 percent toluene. This was found to reduce the $T_m$ to approximately 40° C.

Example 2

A mixture of 12.5 percent photomer 4035, 30 percent RDX 51027, 20 percent EB 220, and 37.5 percent BR-31 was prepared. It was heated to 65° C. for about 1 hour until it melted. Fluorochemical FC-430 was added to the melt in sufficient quantities to bring the FC-430 to 0.1 percent of the mixture. No reduction in $T_m$ was observed.

Example 3

A mixture of 12.5 percent photomer 4035, 30 percent RDX 51027, 20 percent EB 220, and 37.5 percent BR-31 was prepared. It was heated to 65° C. for about 1 hour until it melted. Fluorochemical FC-171 was added to the melt in sufficient quantities to bring the FC-171 to 0.1 percent of the mixture. FC-171 is a fluorochemical surfactant that is commercially available from Minnesota Mining and Manufacturing Company under the trade name Flourad™ FC-171 fluorochemical surfactant. FC-171 comprises greater than 90 percent $C_nF_{2n+1}SO_2N(C_2H_5)(CH_2CH_2O)_{7.5}CH_3$, where n is equal to 8 in 97 percent of the groups and equal to 7 in the remaining groups. The remaining portion of FC-171 is $C_nF_{2n+1}SO_2NH(C_2H_5)$ where n is equal to 8 in 97 percent of the groups and equal to 7 in the remaining groups. This was found to reduce the $T_m$ to approximately 40° C.

Example 4

A mixture of 12.5 percent photomer 4035, 30 percent RDX 51027, 20 percent EB 220, and 37.5 percent BR-31 was prepared. It was heated to 65° C. for about 1 hour until it melted. Fluorochemical FC-724 was added to the melt in sufficient quantities to bring the FC-724 to 0.02 percent of the mixture. FC-724 is a fluorochemical surfactant that is commercially available from Minnesota Mining and Manufacturing Company under the trade name Flourad™ FC-724 fluorochemical surface modifier. FC-724 comprises 0.2 percent a fluorochemical polymer that is a 99/1 copolymer of FOMA and acrylic acid, 9.8 percent $C_6F_{14}$, and 90 percent FC-77. FC-77 includes 75 to 50 percent $C_8F_{16}O$ and 25 to 50 percent $C_8F_{18}$. This was found to reduce the $T_m$ to approximately 40° C.

Example 5

A mixture of 12.5 percent photomer 4035, 30 percent RDX 51027, 20 percent EB 220, and 37.5 percent BR-31 was prepared. It was heated to 65° C. for about 1 hour until it melted. Fluorochemical FC-722 was added to the melt in sufficient quantities to bring the FC-722 to 0.05 percent of the mixture. FC-722 is a fluorochemical that is commercially available from Minnesota Mining and Manufacturing Company under the trade name Flourad™ FC-722 fluorochemical coating. FC-722 comprises 2 percent of a 99/1 copolymer of FOMA and acrylic acid and 98 percent inert. The inert includes 0 to 10 percent of $C_5F_{12}$, at least 90 percent $C_6F_{14}$, and 0 to 10 percent $C_7F_{16}$. This was found to reduce the $T_m$ to approximately 40° C.

Example 6

A mixture of 12.5 percent photomer 4035, 30 percent RDX 51027, 20 percent EB 220, and 37.5 percent BR-31 was prepared. It was heated to 65° C. for about 1 hour until it melted. Fluorochemical FC-722 was added to the melt in sufficient quantities to bring the FC-722 to 0.02 percent of the mixture No reduction in $T_m$ was observed.

Example 7

A mixture of 12.5 percent photomer 4035, 30 percent RDX 51027, 20 percent EB 220, and 37.5 percent BR-31 was prepared. It was heated to 65° C. for about 1 hour until it melted. A polymerizable fluorochemical monomer, FOMA, was added to the melt in sufficient quantities to bring the FOMA to 0.1 percent of the mixture. FOMA may be characterized as $C_7F_{15}CH_2OC(O)C(CH_3)=CH_2$. This was found to reduce the $T_m$ to approximately 40° C.

Example 8

A mixture of 12.5 percent photomer 4035, 30 percent RDX 51027, 20 percent EB 220, and 37.5 percent BR-31 was prepared. It was heated to 65° C. for about 1 hour until it melted. FOMA was added to the melt in sufficient quantities to bring the FOMA to 0.3 percent of the mixture. This was found to reduce the $T_m$ to approximately 40° C.

Example 9

A mixture of 12.5 percent photomer 4035, 30 percent RDX 51027, 20 percent EB 220, and 37.5 percent BR-31 was prepared. It was heated to 65° C. for about 1 hour until it melted. BuFOSEA, a polymerizable fluorochemical monomer commercially available from Minnesota Mining and Manufacturing Company under the trade name Flourad™ FX-189 fluorochemical acrylate was added to the melt in sufficient quantities to bring the BuFOSEA to 0.1 percent of the mixture. BuFOSEA may be characterized as $C_7F_{17}SO_2N(C_4H_9)C_2H_4OC(O)CH=CH_2$. This was found to reduce the $T_m$ to approximately 40° C.

Example 10

A mixture of 12.5 percent photomer 4035, 30 percent RDX 51027, 20 percent EB 220, and 37.5 percent BR-31 was prepared. It was heated to 65° C. for about 1 hour until it melted. BuFOSEA was added to the melt in sufficient quantities to bring the BuFOSEA to 0.3 percent of the mixture. This was found to reduce the $T_m$ to approximately 40° C.

Example 11

A mixture of 12.5 percent Photomer 4035, 30 percent RDX 51027, 20 percent EB 220, and 37.5 percent BR-31 was prepared. It was heated to 65° C. for about 1 hour until it melted. Fluorochemical FC-740 was added to the melt in sufficient quantities to bring the FC-740 to 0.02 percent of the mixture. FC-740 is a fluorochemical surfactant that is commercially available from Minnesota Mining and Manufacturing Company under the trade name Flourad™ FC-740 well stimulation additive. It comprises 50% $C_8Fl_7SO_2N(CH_2CH_3)CH_2CH_2OcOCCH_3=CH_2$ and OctaDecyl Methacrylate and 50% Aromatic Naptha. This was found to reduce the $T_m$ to approximately 40° C.

What is claimed is:

1. A radiation polymerizable composition that is a solid at room temperature including a fluorochemical of a variety and in an amount effective to reduce the melting temperature of said composition below that of said composition absent said fluorochemical.

2. The polymerizable composition of claim 1 wherein said composition comprises a mixture of acrylic monomers and oligomers.

3. The polymerizable composition of claim 1 wherein said radiation is ultraviolet.

4. The polymerizable composition of claim 1 wherein said radiation is an electron beam.

5. The polymerizable composition of claim 1 wherein said fluorochemical is a surfactant.

6. The polymerizable composition of claim 1 wherein said fluorochemical is a polymerizable monomer.

7. The polymerizable composition of claim 1 wherein said fluorochemical is added in sufficient quantity to reduce the melting temperature of the said composition by at least 15° C.

8. The polymerizable composition of claim 1, which comprises an acrylate.

9. The polymerizable composition of claim 8, wherein the acrylate has a hard segment and a soft segment.

10. The polymerizable composition of claim 1, wherein the melting temperature of said composition with said fluorochemical is no more than about 40° C.

11. A polymerizable composition of claim 1, which consists essentially of one or more radiation-polymerizable components and the fluorochemical.

12. A polymerizable composition of claim 11, wherein the radiation-polymerizable components consists essentially of one or more acrylates.

13. A method of reducing the melting temperature of a radiation polymerizable composition that is solid at room temperature comprising the steps of melting said composition; and adding to said melted composition a fluorochemical of a variety and in an amount effective to reduce the melting temperature of said composition.

14. A material formed by radiation polymerizing a radiation polymerizable composition that is a solid at room temperature including a fluorochemical of a variety and in an amount effective to reduce the melting temperature of said composition below that of said composition absent said fluorochemical.

15. The material of claim 14, which is an optical product.

16. A method of making a polymer material comprising the steps of adding to a radiation polymerizable composition that is solid at room temperature a fluorochemical of a variety and in an amount effective to reduce the melting temperature of said composition; and polymerizing said composition.

17. A material formed by the method of claim 16.

18. A method as claimed in claim 16, wherein the radiation polymerizable composition comprises an acrylate.

19. A method as claimed in claim 16, wherein the fluorochemical comprises a surfactant or a polymerizable monomer.

20. A method as claimed in claim 16, wherein the polymer material is an optical material.

* * * * *

UNITED STATES PATENT AND TRADEMARK OFFICE
CERTIFICATE OF CORRECTION

PATENT NO. : 5,908,874            Page 1 of 1
DATED : June 1, 1999
INVENTOR(S) : Bettie C. Fong and Myles L. Brostrom It is certified that error appears in the above-identified patent and that said Letters Patent is hereby corrected as shown below:

Title page,
References Cited, insert references -- 5,296,511; 4,333,998; 3,968,309; and 3,947,525 --.

Column 1,
Line 57, insert -- is -- following "This".

Column 3,
Between lines 7 and 8, insert -- of -- following "percent"

Signed and Sealed this

Nineteenth Day of March, 2002

Attest:

JAMES E. ROGAN
Attesting Officer     Director of the United States Patent and Trademark Office